(12) United States Patent
Bailey et al.

(10) Patent No.: US 9,869,825 B2
(45) Date of Patent: Jan. 16, 2018

(54) LUCENT CONNECTOR TYPED DUPLEX CONNECTOR

(71) Applicant: SUNCALL TECHNOLOGIES (SZ) CO., LTD., Shenzhen (CN)

(72) Inventors: William Bailey, Greer, SC (US); Lei Zhu, Shenzhen (CN); Jiangtao Hu, Shenzhen (CN); Hongbin Song, Shenzhen (CN)

(73) Assignee: SUNCALL TECHNOLOGIES (SZ) CO., LTD., Shenzhen (CN)

( * ) Notice: Subject to any disclaimer, the term of this patent is extended or adjusted under 35 U.S.C. 154(b) by 0 days.

(21) Appl. No.: 15/313,851

(22) PCT Filed: Nov. 27, 2014

(86) PCT No.: PCT/CN2014/092393
§ 371 (c)(1),
(2) Date: Nov. 23, 2016

(87) PCT Pub. No.: WO2016/082160
PCT Pub. Date: Jun. 2, 2016

(65) Prior Publication Data
US 2017/0205590 A1    Jul. 20, 2017

(51) Int. Cl.
*G02B 6/38* (2006.01)
*H01R 13/60* (2006.01)
(Continued)

(52) U.S. Cl.
CPC ......... *G02B 6/3885* (2013.01); *G02B 6/3858* (2013.01); *G02B 6/3878* (2013.01);
(Continued)

(58) Field of Classification Search
None
See application file for complete search history.

(56) References Cited

U.S. PATENT DOCUMENTS 9,739,955 B2 *   8/2017   Lee ...................... G02B 6/3893
9,761,998 B2 *   9/2017   De Dios Martin    H01R 13/6335
(Continued)

FOREIGN PATENT DOCUMENTS

CN    102 928 934    2/2013
CN    203 759 306    8/2014
(Continued)

*Primary Examiner* — Jerry Rahll
(74) *Attorney, Agent, or Firm* — Fay Kaplun & Marcin, LLP

(57) ABSTRACT

A LC-typed duplex connector includes a connecting head assembly, a boot assembly and a handle. The handle includes a first elastic structure portion, a second elastic structure portion and a hand shank portion. When the second elastic structure portion is detached from the boot assembly, the first elastic structure portion is detached from the connecting head assembly under the action of the hand shank portion, achieving the detachment and alternate side operation of the LC-typed duplex connector. The detachable handle can efficiently fasten the connecting head assembly with the boot assembly together. The first and second elastic structure portions are easier to detach from the connecting head assembly and the boot assembly respectively under the action of the hand shank portion. Moreover, the hand shank portion is matched with the tail end of the boot assembly, thereby improving efficiently the space utilization of the panel.

10 Claims, 3 Drawing Sheets

(51) Int. Cl.
*H01R 13/50* (2006.01)
*H01R 13/633* (2006.01)
*H01R 13/506* (2006.01)

(52) U.S. Cl.
CPC ......... *G02B 6/3887* (2013.01); *G02B 6/3893* (2013.01); *H01R 13/506* (2013.01); *H01R 13/6335* (2013.01)

(56) References Cited

U.S. PATENT DOCUMENTS

| | | | | |
|---|---|---|---|---|
| 2011/0294334 | A1* | 12/2011 | Phillips | G02B 6/4201 439/357 |
| 2011/0299814 | A1* | 12/2011 | Nakagawa | G02B 6/3879 385/78 |
| 2012/0033922 | A1* | 2/2012 | Nakagawa | G02B 6/3879 385/78 |
| 2012/0155810 | A1* | 6/2012 | Nakagawa | G02B 6/3878 385/78 |
| 2013/0089995 | A1* | 4/2013 | Gniadek | H01R 13/6335 439/152 |
| 2013/0216188 | A1* | 8/2013 | Lin | G02B 6/3893 385/77 |
| 2013/0301994 | A1* | 11/2013 | Motofuji | G02B 6/36 385/78 |
| 2014/0038447 | A1* | 2/2014 | Brown | H01R 13/62 439/350 |
| 2014/0321821 | A1* | 10/2014 | Hsieh | G02B 6/4292 385/93 |
| 2016/0047993 | A1* | 2/2016 | Hioki | G02B 6/3869 385/139 |
| 2016/0116685 | A1* | 4/2016 | Wong | G02B 6/3825 385/56 |
| 2017/0205590 | A1* | 7/2017 | Bailey | G02B 6/3885 |

FOREIGN PATENT DOCUMENTS

| | | |
|---|---|---|
| CN | 203 786 334 | 8/2014 |
| CN | 204 289 894 | 4/2015 |
| EP | 1 450 185 | 8/2004 |
| JP | 2009 222 932 | 10/2009 |

* cited by examiner

LUCENT CONNECTOR TYPED DUPLEX CONNECTOR

TECHNICAL FIELD

The present invention relates to the field of connector technologies and, in particular, to a Lucent Connector (LC) typed duplex connector.

TECHNICAL BACKGROUND

When an existing conventional LC-typed duplex connector and an adaptor are amounted on a panel of an equipment cabinet, it is required to reserve an interval between upper and lower LC-typed duplex connectors so as to facilitate fingers to reach within the interval for pressing a press handle above the connector and thus unlocking and detachment the connectors. The configuration reduces space utilization of the panel, increases the operation costs of the equipment, and is unbeneficial to the detachment and alternate side operation of the LC-typed duplex connector, further greatly influencing the working efficiency.

SUMMARY OF THE INVENTION

An object of the disclosure is to provide a LC-typed duplex connector, which has a simple structure, is easier to detach, and efficiently improves the space utilization.

To achieve the object, the following solutions can be adopted.

A LC-typed duplex connector includes a connecting head assembly and a boot assembly matching with the connecting head assembly, and further includes a handle for rapidly detaching the connecting head assembly from the boot assembly. The handle includes a first elastic structure portion, which is disposed at a front end of the handle for matching with the connecting head assembly; a second elastic structure portion, which is disposed at middle of the handle for matching with a front end of the boot assembly; and a hand shank portion, which is disposed at a tail end of the handle for matching with a tail end of the boot assembly.

The first elastic structure portion includes two structurally identical elastic arms disposed at the front end of the handle, first elongated slots are disposed at end portions of two elastic arms, respectively, for improving the elasticity of the end portions, and positioning embosses are disposed outwardly on both sidewalls at the end portions of the elastic arms.

The connecting head assembly includes connecting head casings, a through hole runs vertically through a front end of each of the connecting head casings for matching with positioning blocks at the end portions of the elastic arms, positioning holes run transversely through sidewalls at upper and lower ends of the through hole for matching with the positioning embosses.

The second elastic structure portion includes a first supporting wall disposed vertically on an undersurface at the middle of the handle, a base disposed horizontally on a bottom end of the first supporting wall; and a clamping arm disposed vertically on the base; a second elongated slot passes through a middle portion of the clamping arm for improving the elasticity of the clamping arm, and clamping hooks are disposed on both sidewalls at the bottom end of the clamping arms.

The boot assembly includes a boot and a branching clamp matching with a port at the front end of the boot, a clamping hole pass vertically through sidewalls of the boot assembly for matching with the clamping arm, and clamping grooves are disposed on an upper wall and a lower wall of the boot at the upper and lower ends of the clamping hole, respectively, for matching with the clamping hook.

The hand shank portion includes a recess matching with an outer surface of the tail end of the boot assembly, and a tail shank disposed at the tail end of the hand shank portion for pressing down and lifting up the handle; skidproof stripes are disposed at upper and lower surfaces of the tail shank, and a third elongated slot pass through a bottom face of the recess.

The boot assembly further includes a supporting ring which is disposed at a tail end of the branching clamp and a compression ring through which the branching clamp runs, skidproof stripes are disposed at an outer surface of the tail end of the branching clamp and at an outer surface of the supporting ring.

A tail end of each of the connector casing lengthened caps is inserted into the branching clamping and is matched with the front end of the branching clamping.

A cylinder and a square are successively disposed at a tail end of each of the connector casing lengthened caps from inside to outside, a first flanges and a second cambered flange are disposed symmetrically on upper and lower surfaces of the square.

The beneficial effects of the disclosure lie in that a LC-typed duplex connector includes a connecting head assembly, a boot assembly matching with the connecting head assembly and a handle for rapidly detaching the connecting head assembly from the boot assembly. The handle includes a first elastic structure portion, which is disposed at the front end of the handle for matching with the connecting head assembly; a second elastic structure portion, which is disposed at the middle of the handle for matching with the front end of the boot assembly; and a hand shank portion, which is disposed at the tail end of the handle for matching with the tail end of the boot assembly. When the second elastic structure portion is detached from the boot assembly, the first elastic structure portion is detached from the connecting head assembly under the action of the hand shank portion, achieving the detachment and alternate side operation of the LC-typed duplex connector. The detachable handle can efficiently fasten the connecting head assembly with the boot assembly together. The first and second elastic structure portions are easier to detach from the connecting head assembly and the boot assembly respectively under the action of the hand shank portion. Moreover, the hand shank portion is matched with the tail end of the boot assembly, thereby improving efficiently the space utilization of the panel. The LC-typed duplex connector has a simple structure, is easier to assembly and disassembly, and improves efficiently the space utilization of the panel.

Figure 1:
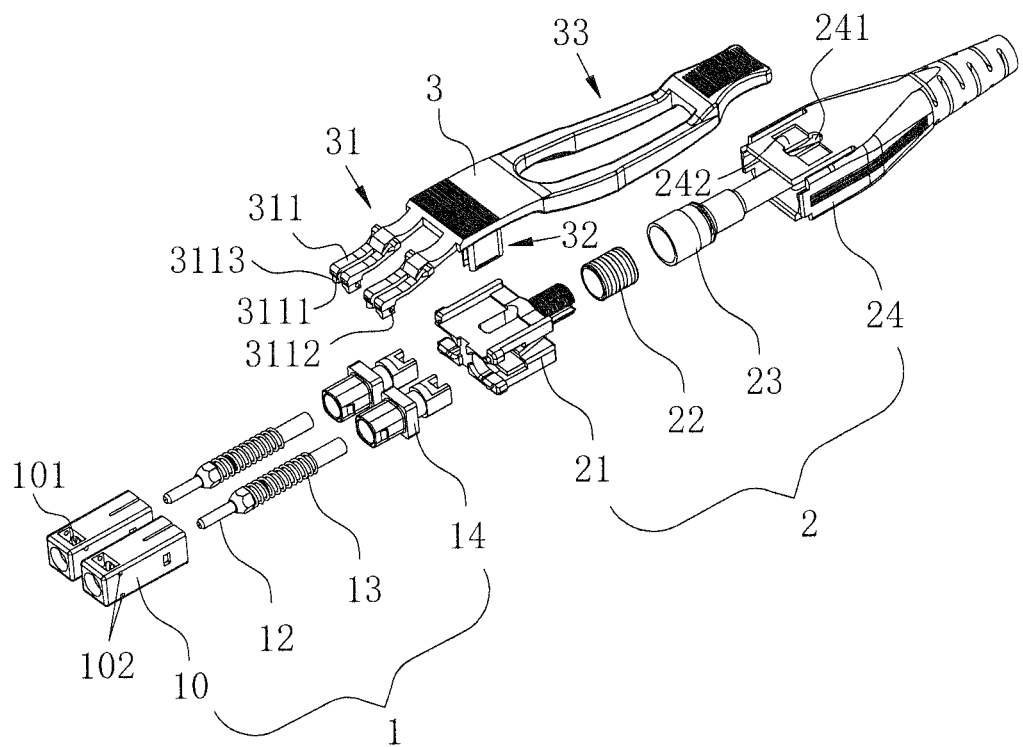
FIG. 1 is an exploded structural view showing a LC-typed duplex connector according to an embodiment of the disclosure.

A list of the reference numerals:

| 1: Connecting Head Assembly; | 10: Connecting Head Casing; | 12: Ceramic Ferrule; |
|---|---|---|
| 13: Spring; | 14: Connector Casing Lengthened Cap; | |
| 141: Cylinder; | 142: Cube; | |
| 143: First Cambered Flange; | 144: Second Cambered Flange; | 101: Through Hole; |
| 102: Positioning Hole; | 2: Boot Assembly; | |
| 21: Branching Clamp; | 22: Supporting Ring; | |
| 23: Compression Ring; | 24: Boot; | |
| 241: Clamping Hole; | 242: Clamping Groove; | 3: Handle; |
| 31: First Elastic Structure Portion; | 311: Elastic Arm; | |
| 3111: First Elongated Slot; | 3112: Positioning Emboss; | |
| 3113: Positioning Block; | 32: Second Elastic Structure Portion; | |
| 321: First Supporting Wall; | 322: Base; | 323: Clamping Arm; |
| 3231: Second Elongated Slot; | 3232: Clamping Hook; | |
| 33: Hand Shank Portion; | 331: Recess; | |
| 3311: Third Elongated Slot; | 332: Tail Shank. | |

DETAILED DESCRIPTION OF THE PREFERRED EMBODIMENT

The disclosure will be further described below by way of embodiments in combination with the accompanying drawings.

Figure 2:
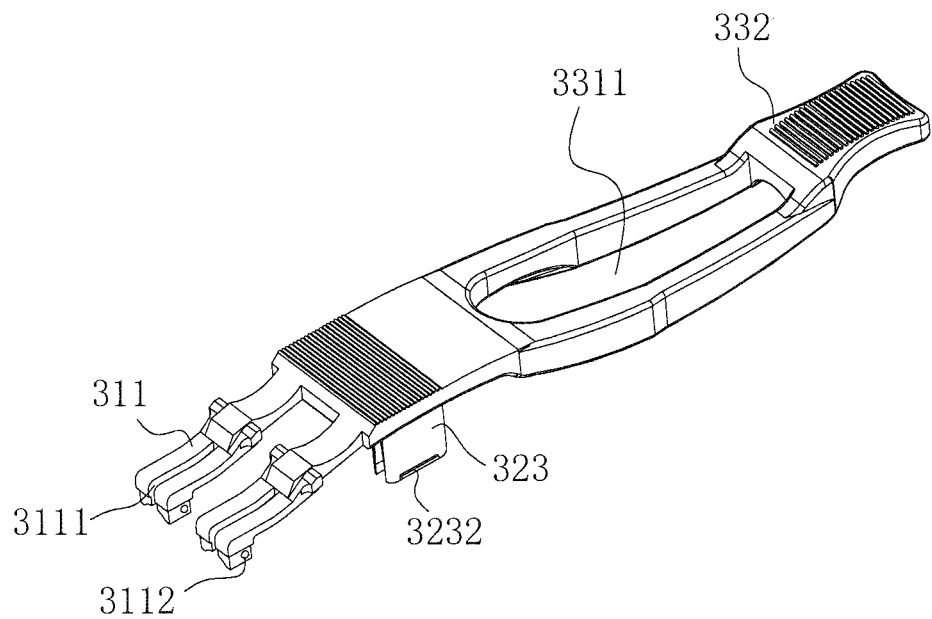
FIG. 2 is an isometric front view of a handle shown in FIG. 1.

As shown in FIGS. 1 and 2, a LC-typed duplex connector includes a connecting head assembly 1; a boot assembly 2 matching with the connecting head assembly 1; and a handle 3 for rapidly detaching the connecting head assembly 1 from the boot assembly 2. The handle 3 includes a first elastic structure portion 31 which is disposed at the front end of the handle 3 for matching with the connecting head assembly 1; a second elastic structure portion 32, which is disposed at the middle of the handle 3 for matching with the front end of the boot assembly 2; and a hand shank portion 33, which is disposed at the tail end of the handle 3 for matching with the tail end of the boot assembly 2. When the second elastic structure portion 32 is detached from the boot assembly 2, the first elastic structure portion 31 is detached from the connecting head assembly 1 under the action of the hand shank portion 33, achieving the detachment and alternate side operation of the LC-typed duplex connector.

As a preferable embodiment, the first elastic structure portion 31 includes two structurally identical elastic arms 311 disposed at the front end of the handle 3. First elongated slots 3111 are disposed at the end portions of two elastic arms 311, respectively, for improving the elasticity of the end portions. Positioning embosses 3112 are disposed outwardly on both sidewalls at the end portions of the elastic arms 311. The connecting head assembly 1 includes connecting head casings 10. Through holes 101 run vertically through the front end of the connecting head casings 10 for matching with positioning blocks 3113 at the end portion of the elastic arms 311. Positioning holes 102 run transversely through the sidewalls at upper and lower ends of the through holes 101 for matching with the positioning embosses 3112. In this configuration, the first elongated slots 3111 are configured to divide positioning blocks 3113 at the end portion of the elastic arms 311 into two, improving efficiently the elasticity of the end portion of the elastic arms when the positioning blocks 3113 are matched with the through holes 101, and facilitating the positioning blocks to be matched with the through holes 101. The positioning embosses 3112 are disposed on both sidewalls of the elastic arms for matching with the positioning holes 102 on the sidewalls of the through holes, which prevent the positioning blocks 3113 at the end portion of the elastic arms 311 from popping off the through holes 101 on the connecting head casing 10 after assembled with the through holes 101.

As a preferable embodiment, the positioning embosses 3112 are disposed at sidewalls of the positioning blocks in contact with the through holes 101.

Moreover, for facilitating to turn the LC-typed duplex connector over 180° for the alternate side operation thereof and avoiding directly contacting thinner cable core with the hands and further preventing the cable core from being broken, the positioning holes 102 are disposed on the sidewalls at the upper and lower ends of the through holes 101 for matching with the positioning embosses 3112 such that the handle 3 is capable of matching with the upper and lower faces of the LC-typed duplex connector, further ensuring efficiently the alternate side operation after turning the LC-typed duplex connector over 180°.

Figure 3:
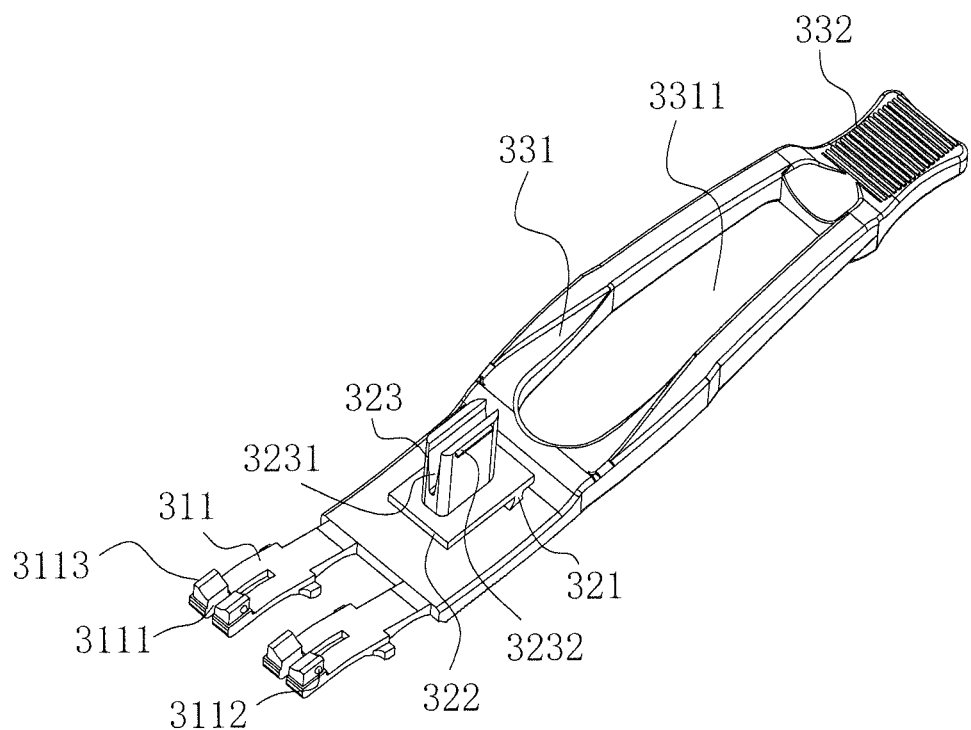
FIG. 3 is an isometric back view of the handle shown in FIG. 1.

As shown FIG. 3, the second elastic structure portion 32 includes a first supporting wall 321 disposed vertically on the undersurface at the middle of the handle 3; a base 322 disposed horizontally on a bottom end of the first supporting wall 321; and a clamping arm 323 disposed vertically on the base 322. A second elongated slot 3231 passes through the middle portion of the clamping arm 323 for improving the elasticity of the clamping arm 323, and clamping hooks 3232 are disposed on both sidewalls at the bottom end of the clamping arms 323. The boot assembly 2 includes a boot 24 and a branching clamp 21 matching with a port at the front end of the boot 24. A clamping hole 241 pass vertically through an upper wall and a lower wall at the front end of the boot assembly 2 for matching with the clamping arm 323, and clamping grooves 242 are disposed on an upper wall and a lower wall of the boot 24 at the upper and lower ends of the clamping hole 241, respectively, for matching with the clamping hook 3232. When it is required to implement the alternate side operation and the disassembly of the connector, two sidewalls at the bottom end of the clamping arm are pushed inwardly, and then the hand shank is lift up and the positioning blocks at the end portion of the elastic arm 311 in the first elastic structure portion slip off the through holes 101, the handle 3 is detached from the connecting head assembly 1 and the boot assembly 2 by this time. For ensuring the handle efficient connection with the connecting head assembly 1 and the boot assembly 2 after alternate side operation, the clamping grooves 242 are disposed on the upper and lower walls of the boot 24 at the upper and lower ends of the clamping hole 241, respectively, for matching with the clamping hook 3232, thereby ensuring that the clamping arms 323 are capable of being snapped in the upper and lower walls of the boot.

Moreover, the lever principle is adopted among the first and second elastic structure portions 31 and 32 and the hand shank portion 33. When a force is applied on the hand shank portion 33, the second elastic structure portion 32 corresponds to a fulcrum such that the ends portion of the elastic arms in the first elastic structure portion are easy to slip off the through holes 101, thereby implementing conveniently and rapidly the assembly and the alternate side operation of the LC-typed duplex connector.

Figure 4:
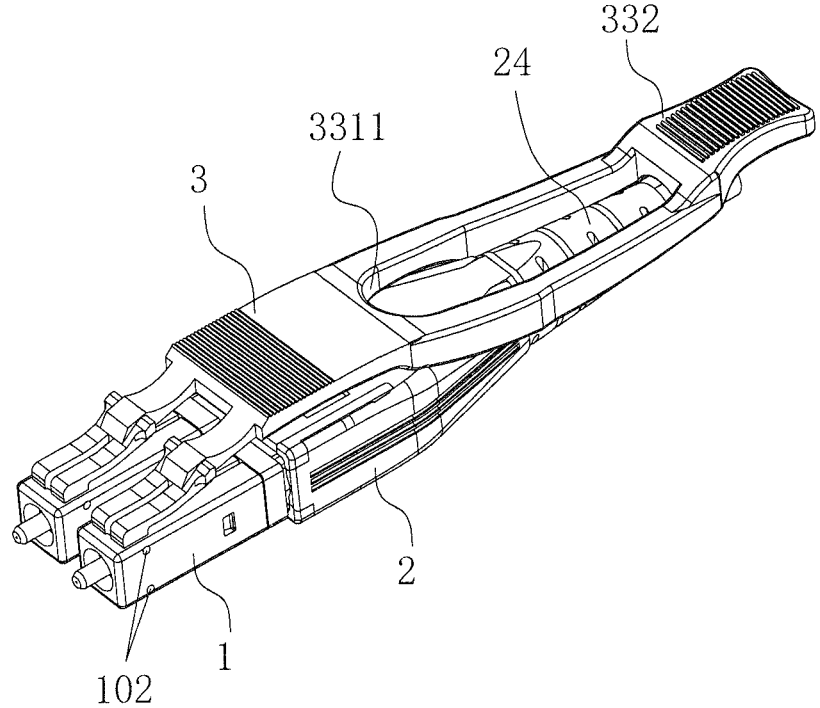
FIG. 4 is an isometric front view showing the assembly of the LC-typed duplex connector according to the disclosure.
Figure 5:
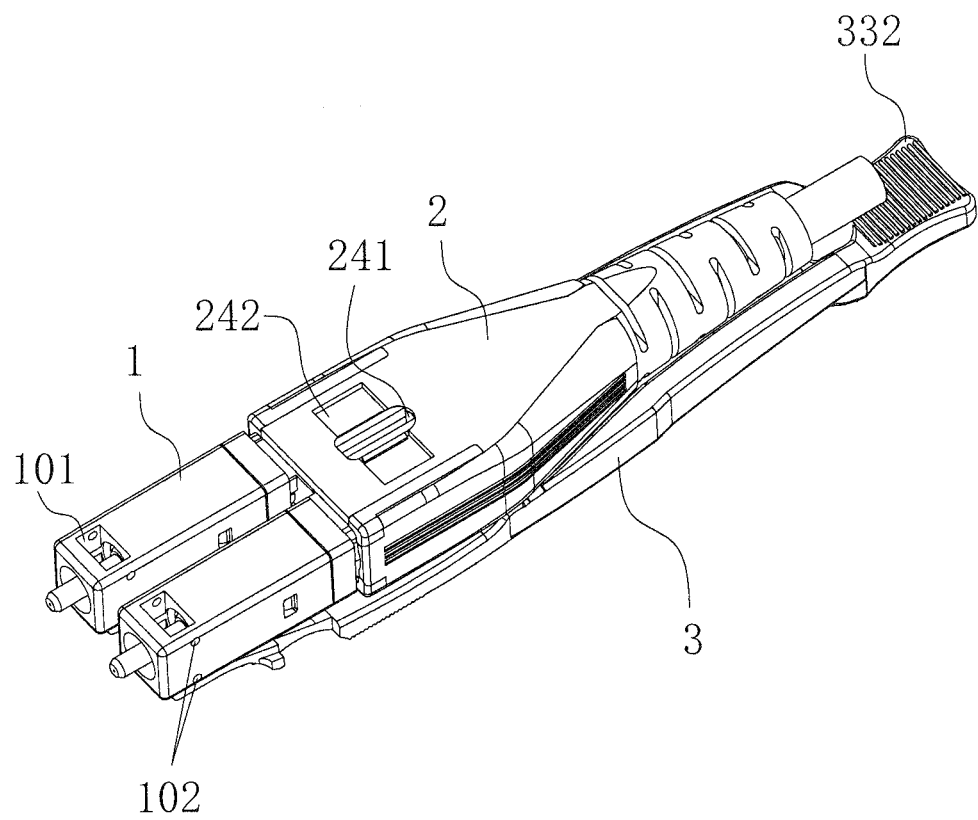
FIG. 5 is an isometric back view showing the assembly of the LC-typed duplex connector according to the disclosure.

As a further preferable embodiment, as shown in FIGS. 3 to 5, the hand shank portion 33 includes a recess 331 matching with an outer surface of the tail end of the boot assembly 2; and a tail shank 332 disposed at the tail end of the hand shank portion 33 for pressing down and lifting up the handle 3. Skidproof stripes are disposed at the upper and lower surfaces of the tail shank 332, and a third elongated slot 3311 pass through the bottom face of the recess 331. In this configuration, the recess 331 is configured to be fit tightly with the boot such that the handle is integrated with the boot assembly, further reducing efficiently the size of the LC-typed duplex connector. Moreover, the tail shank 332 is disposed at the hand shank portion 33 to avoid the fingers entering between two connectors for disassembly, thereby implementing conveniently and rapidly the assembly and the alternate side operation.

As a further preferable embodiment, the connecting head assemble 1 further includes ceramic ferrules 12 which are inserted within the connecting head casing 10; springs 13 through which the ceramic ferrules 12 run; and connector casing lengthened caps 14 which are matched with the tail ends of the ceramic ferrules 12. The boot assembly 2 further includes a supporting ring 22 which is disposed at the tail end of the branching clamp 21 and a compression ring 23 through which the branching clamp 21 runs. Skidproof stripes are disposed at the outer surface of the tail end of the branching clamp 21 and at the outer surface of the supporting ring 22 such that the tail end of the branching clamp 21, the supporting ring 22 and the compression ring 23 which run through each other fit tightly for preventing the various parts from slipping off each other.

Figure 6:
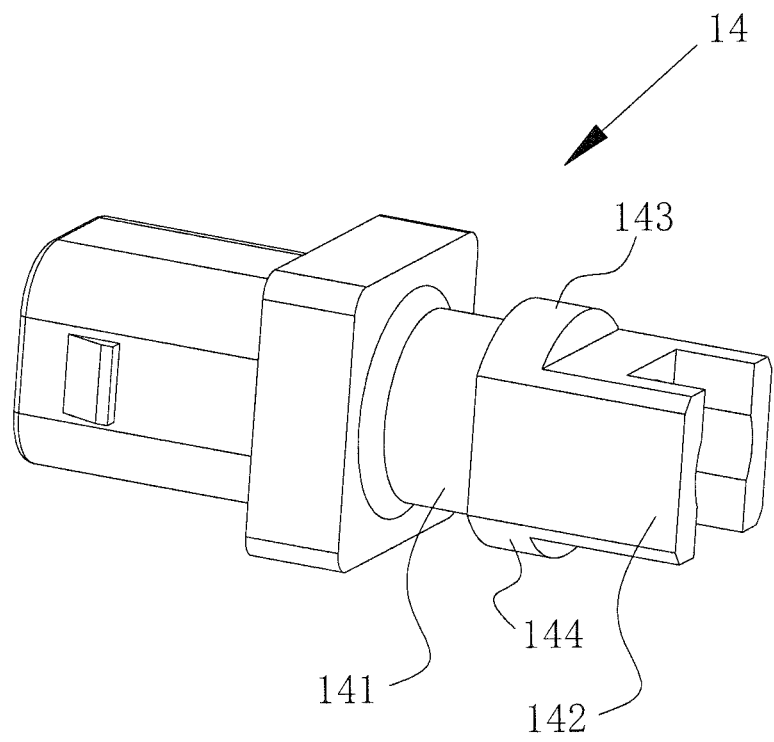
FIG. 6 is a schematic view showing the structure of a connector casing lengthened cap according to the disclosure.

As shown in FIG. 6, tail ends of a connector casing lengthened caps 14 are inserted into the branching clamping 21 and are matched with the front end of the branching clamping 21. A cylinder 141 and a square 142 are successively disposed at the tail end of each of the connector casing lengthened cap 14 from inside to outside. First and second cambered flanges 143 and 144 are disposed symmetrically on upper and lower surfaces of the square. The tail end of the connector casing lengthened cap 14 is capable of matching with the front end of the branching clamp 21 stably and reliably by this configuration. Further preferably, two fixed positions are disposed at left and right sides of the branching clamp 21 symmetrically, respectively, for matching with the tail end of each of the connector casing lengthened cap 14. The first and second cambered flanges 143 and 144 can constrain the movement between the connector casing lengthened cap 14 and the branching clamp 21. The square 142 can prevent the connector casing lengthened cap 14 from rotating within the front end of the branching clamp 21.

The technical principle of the disclosure has been described in combination with the specific embodiments above. These descriptions are only intended to explain the principle of the disclosure, but not to limit the protection scope of the disclosure in any way. Base on this explanation, other specific embodiments can be conceived by those skilled in the art without any creative labor, and fall within the protection scope of the disclosure.

The invention claimed is:

1. A LC-typed duplex connector, comprising:
    a connecting head assembly;
    a boot assembly matching with the connecting head assembly; and
    a handle configured to detach the connecting head assembly from the boot assembly,
    wherein the handle includes a first elastic structure portion, which is disposed at a front end of the handle for matching with the connecting head assembly; a second elastic structure portion, which is disposed at middle of the handle for matching with a front end of the boot assembly; and a hand shank portion, which is disposed at a tail end of the handle (3) for matching with a tail end of the boot assembly, and
    wherein when the second elastic structure portion is detached from the boot assembly, the first elastic structure portion is detached from the connecting head assembly under the action of the hand shank portion, achieving detachment and alternating sides operation of the LC-typed duplex connector.

2. The LC-typed duplex connector of claim 1, wherein the first elastic structure portion comprises two structurally identical elastic arms disposed at the front end of the handle, first elongated slots are disposed at end portions of two elastic arms, respectively, for improving the elasticity of the end portions, and positioning embosses are disposed outwardly on both sidewalls at the end portions of the elastic arms.

3. The LC-typed duplex connector of claim 2, wherein the connecting head assembly comprises connecting head casings, a through hole runs vertically through a front end of each of the connecting head casings for matching with positioning blocks at the end portions of the elastic arms, positioning holes run transversely through sidewalls at upper and lower ends of the through hole for matching with the positioning embosses.

4. The LC-typed duplex connector of claim 3, wherein the second elastic structure portion comprises a first supporting wall disposed vertically on an undersurface at the middle of the handle, a base disposed horizontally on a bottom end of the first supporting wall; and a clamping arm disposed vertically on the base; a second elongated slot passes through a middle portion of the clamping arm for improving the elasticity of the clamping arm, and clamping hooks are disposed on both sidewalls at the bottom end of the clamping arms.

5. The LC-typed duplex connector of claim 4, wherein the boot assembly comprises a boot and a branching clamp matching with a port at the front end of the boot, a clamping hole pass vertically through sidewalls of the boot assembly for matching with the clamping arm, and clamping grooves are disposed on an upper wall and a lower wall of the boot at the upper and lower ends of the clamping hole, respectively, for matching with the clamping hook.

6. The LC-typed duplex connector of claim 1 wherein the hand shank portion comprises a recess matching with an outer surface of the tail end of the boot assembly, and a tail shank disposed at the tail end of the hand shank portion for pressing down and lifting up the handle; skid proof stripes are disposed at upper and lower surfaces of the tail shank, and a third elongated slot pass through a bottom face of the recess.

7. The LC-typed duplex connector of claim 5, wherein the connecting head assemble further comprises ceramic ferrules, springs and connector casing lengthened caps, each of the ceramic ferrules is inserted within respective one of the connecting head casings; each of the ceramic ferrules runs through respective one of the springs; and each of the connector casing lengthened caps is matched with a tail end of respective one of the ceramic ferrules.

8. The LC-typed duplex connector of claim 7, wherein the boot assembly further comprises a supporting ring which is disposed at a tail end of the branching clamp and a compression ring through which the branching clamp runs, skid proof stripes are disposed at an outer surface of the tail end of the branching clamp and at an outer surface of the supporting ring.

9. The LC-typed duplex connector of claim 8, wherein a tail end of each of the connector casing lengthened caps is inserted into the branching clamping and is matched with the front end of the branching clamping.

10. The LC-typed duplex connector of claim 9, wherein a cylinder and a square are successively disposed at a tail end of each of the connector casing lengthened caps from inside to outside, a first flanges and a second cambered flange are disposed symmetrically on upper and lower surfaces of the square.

* * * * *